(12) United States Patent
Pryor et al.

(10) Patent No.: US 8,289,170 B2
(45) Date of Patent: Oct. 16, 2012

(54) SYSTEM AND METHOD FOR PROXIMITY DETECTION

(75) Inventors: Aric Pryor, Boonville, IN (US); Mark Watson, Lexington, KY (US); Mike E. Ciholas, Evansville, IN (US); Justin E. Bennett, Evansville, IN (US); Paul R. Blaylock, Evansville, IN (US); Christopher J. Elpers, Evansville, IN (US); Evan M. Buchanan, Evansville, IN (US); Christopher Gander, Evansville, IN (US); Timothy M. DeBaillie, Evansville, IN (US)

(73) Assignee: Alliance Coal, LLC, Lexington, KY (US)

( * ) Notice: Subject to any disclaimer, the term of this patent is extended or adjusted under 35 U.S.C. 154(b) by 840 days.

(21) Appl. No.: 12/432,238

(22) Filed: Apr. 29, 2009

(65) Prior Publication Data

US 2009/0267787 A1 Oct. 29, 2009

Related U.S. Application Data

(60) Provisional application No. 61/048,735, filed on Apr. 29, 2008, provisional application No. 61/081,564, filed on Jul. 17, 2008.

(51) Int. Cl.
*G08B 23/00* (2006.01)
(52) U.S. Cl. .......... 340/573.4; 340/435; 340/686.6; 340/573.1; 340/539.1
(58) Field of Classification Search .......... 340/435, 340/686.6, 573.1, 539.13
See application file for complete search history.

(56) References Cited

U.S. PATENT DOCUMENTS

| | | | |
|---|---|---|---|
| 4,518,958 A | 5/1985 | Cook et al. | |
| 4,532,501 A | 7/1985 | Hoffman | |
| 5,939,986 A | 8/1999 | Schiffbauer et al. | |
| 6,810,353 B2 | 10/2004 | Schiffbauer | |
| 8,170,787 B2 * | 5/2012 | Coats et al. | 701/301 |
| 2003/0051181 A1 * | 3/2003 | Magee et al. | 713/320 |
| 2006/0087443 A1 | 4/2006 | Frederick | |
| 2006/0140452 A1 * | 6/2006 | Raynor et al. | 382/115 |
| 2007/0194944 A1 * | 8/2007 | Galera et al. | 340/686.6 |
| 2008/0001755 A1 * | 1/2008 | Puzio et al. | 340/572.1 |
| 2010/0289646 A1 * | 11/2010 | Raniere | 340/572.1 |

OTHER PUBLICATIONS

Korean Intellectual Property Office, International Search Report and Written Opinion for international patent application PCT/US2009/042089, mailed Dec. 30, 2009.

\* cited by examiner

*Primary Examiner* — Daryl Pope
(74) *Attorney, Agent, or Firm* — Stites & Harbison PLLC; Jeffrey A. Haeberlin

(57) ABSTRACT

A system and method for detecting a proximity of a person to a machine includes a first transmitter unit carried by the person, a plurality of receiver units located on the machine at know locations, and a processing unit including data defining a first boundary around the machine. The first transmitter unit transmits a magnetic proximity signal having a predetermined signal strength and a predetermined signal frequency. Each of the plurality of receiver units is for determining a received signal strength of the received magnetic proximity signal. The processing unit: determines a location of the first transmitter unit relative to the machine based on the received signal strength of the magnetic proximity signal and the known location of the plurality of receiver units; and outputs a proximity warning signal if the location of the transmitter relative to the machine is within the first boundary around the machine.

24 Claims, 8 Drawing Sheets

SYSTEM AND METHOD FOR PROXIMITY DETECTION

CROSS-REFERENCE TO RELATED APPLICATIONS

This application claims the benefit of U.S. Provisional Patent Application No. 61/048,735, filed Apr. 29, 2008, and U.S. Provisional Patent Application No. 61/081,564, filed Jul. 17, 2008, the entire disclosures of which are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to a system and method for the detection of a transmitter unit in the proximity of a receiver system. More specifically, the present invention relates to a system that detects the proximity of a person carrying the transmitter to a dangerous machine configured with the receiver system, and determines if that person is close enough to be in danger.

2. Description of Prior Art

Industrial machines may be necessarily large and powerful. For example, continuous mining machines may be 40 feet long, 10-12 feet wide, 3-4 feet tall, and weigh 40 tons. Such machines have injured or killed people while being operated. For example, in "tramming," a continuous mining machine mounted on tracks is moved from one location to another in confined spaces at relatively high speeds and can turn or change directions fast enough to pin an operator against a rib (i.e., wall) of the mining space.

With respect to the environment, it is may not be possible to set up traditional operator protection systems, such as light fences or guard rails, because the environment is generally unstructured (e.g., mining machines create the environment as they operate). Further, such environments are often noisy, dusty and wet.

A transducer, speaker or microphone that is exposed to such an environment is not likely to survive or function properly. For example, sonar and laser time-of-flight sensors exposed to such an environment will become dirty and non-operational very quickly. Further, such sensors have difficulty distinguishing between a people and other structural components in the environment, such as the wall of the mining space.

With respect to radio time-of-flight sensors, such as radar, while the components may be more durable in the environment the relatively short distances (e.g., two feet to 50 feet) between the operator and the machine make such sensors impractical and unreliable. Further, the requirement of a relatively large radio dish or directional radio antenna is impractical.

Alternatively, other systems utilize a magnetic field generator on the machine and a magnetic field sensor carried by the operator. The magnetic field generator creates a magnetic field around the machine. The magnetic field sensor senses the strength of the magnetic field and then relays the strength of the filed by radio back to the machine. If the operator is determined to be too close to the machine, the machine is shut down. However, this system is limited to a substantially circular safety perimeter around the machine, so there is no ability to arbitrarily define a safety perimeter because there is no way to determine an exact location of the operator with respect to the machine. Thus, the safety perimeter must be set to a radius that includes a safety margin from the most distant points of concern of the machine, leaving areas that are safe inside of the safety perimeter. This becomes a nuisance because it prevents the operator from operating in areas that are safe and effective because of the lack of geometric control of the safety perimeter.

What is needed is a system that can determine the location of the operator with respect to the machine and, if necessary, shut the machine down without requiring any structure in the environment. Advantageously, with such a system, the operator will learn to maintain a safe distance from the machine to be efficient in their job.

BRIEF SUMMARY OF THE INVENTION

In accordance with a first aspect of the invention, a system for detecting a proximity of a person to a machine, includes: a first transmitter unit; a plurality of receiver units; and a processing unit. The first transmitter unit is for being carried by the person. The first transmitter unit transmitting a magnetic proximity signal having a predetermined signal strength and a predetermined signal frequency. Each of the plurality of receiver units is located on the machine at a known location for receiving the magnetic proximity signal and determining a received signal strength of the magnetic proximity signal. The processing unit is in communication with the plurality of receiver units and includes a storage medium having data defining a first boundary around the machine. The processing unit: determines a location of the first transmitter unit relative to the machine based on the received signal strength of the magnetic proximity signal received by at least two of the plurality of receiver units and the known location of the at least two of the plurality of receiver units; and outputs a proximity warning signal if the location of the first transmitter unit relative to the machine is within the first boundary around the machine.

According to one implementation, the system further includes a warning device in communication with the processing unit. The warning device provides a visual signal in response to receiving the proximity warning signal from the processing unit. The warning device may further provide an audible signal in response to receiving the proximity warning signal from the processing unit.

According to another implementation, the machine includes a control interface for controlling operation of the machine. The processing unit is in communication with the control interface for controlling the operation of the machine and includes data defining a second boundary around the machine. The processing unit outputs a control signal to the control interface of the machine to limit the operation of the machine if the location of the first transmitter unit relative to the machine is within the second boundary around the machine.

According to yet another implementation, the machine includes a control interface for controlling operation of the machine and reporting an operating state of the machine. The processing unit is in communication with the control interface for controlling the operation of the machine and includes data defining a plurality of boundaries around the machine. The processing unit: receives an operating state signal indicating the operating state of the machine from the control interface of the machine; selects a selected boundary from the plurality of boundaries around the machine based on the operating state signal; and outputs a control signal to the control interface of the machine to limit the operation of the machine if the location of the first transmitter unit relative to the machine is within the selected boundary.

According to still another implementation, the processing unit further comprises a non-volatile storage medium, and stores time-indexed data in the non-volatile storage medium corresponding to the location of the first transmitter unit relative to the machine. The machine may includes a control interface for reporting an operating state of the machine, and the processing unit is in communication with the control interface and stores time-indexed data in the non-volatile storage medium corresponding to the operating state of the machine.

According to still yet another implementation, the first transmitter unit comprises a transmitter microcontroller for generating the magnetic proximity signal, and a first magnetic proximity signal transmitting coil for transmitting the magnetic proximity signal. The first transmitter unit may further comprise: a second magnetic proximity signal transmitting coil in communication with the transmitter microcontroller and oriented orthogonally to the first magnetic proximity signal transmitting coil; a third magnetic proximity signal transmitting coil in communication with the transmitter microcontroller and oriented orthogonally to the first magnetic proximity signal transmitting coil and to the second magnetic proximity signal transmitting coil; and an accelerometer in communication with the transmitter microcontroller, the accelerometer measuring a direction of gravity. The transmitter microcontroller may then selects a most appropriate coil based on the direction of gravity and generates the magnetic proximity signal for transmission by the most appropriate coil.

Each of the plurality of receiver units may comprise a magnetic proximity signal receiving coil for receiving the magnetic proximity signal, and a received signal strength indicator (RSSI) circuit in communication with the magnetic proximity signal receiving coil for determining the received signal strength of the magnetic proximity signal. Each of the plurality of receiver units may further comprise a receiver microcontroller in communication with the RSSI circuit and includes a receiver storage medium having distance data for converting the received signal strength of the magnetic proximity signal to a distance value. Then, the first transmitter unit may further comprise a first digital radio transmitter for sending a transmitter unit digital radio message having a temporal relationship with the magnetic proximity signal, and each of the plurality of receiver units may comprise a respective digital radio receiver for receiving the transmitter unit digital radio message.

In one implementation, the processing unit outputs a control signal to a control interface of the machine to limit operation of the machine if the transmitter unit digital radio message has not been received by at least one of the plurality of receiver units within a predetermined period of time.

In another implementation, the system includes a second transmitter unit comprising a second digital radio transmitter for sending a second transmitter unit digital radio message, wherein the transmitter unit digital radio message contains a first unique identification code, wherein the second transmitter unit digital radio message contains a second unique identification code. The first transmitter unit may further include a first digital radio receiver, and send the transmitter unit digital radio message and the magnetic proximity signal with a predetermined temporal relationship. The second transmitter unit may further include a second digital radio receiver, and send the second transmitter unit digital radio message and the magnetic proximity signal with the predetermined temporal relationship. Lastly, the first transmitter unit may verify that the second transmitter unit is not transmitting using the first digital radio receiver before sending the transmitter unit digital radio message and the magnetic proximity signal, and the second transmitter unit may verify that the first transmitter unit is not transmitting using the second digital radio receiver before sending the second transmitter unit digital radio message and the magnetic proximity signal.

According to another implementation, the first transmitter unit further includes a means for verifying proper operation of the first transmitter unit and a means for indicating a transmitter malfunction if proper operation of the first transmitter unit is not verified. Then, the system may further include a means for disabling the machine in response to an indication of a transmitter malfunction by the means for indicating a transmitter malfunction.

According to another aspect of the invention, a method for detecting a proximity of a person to a machine, includes: determining a location of a first transmitter unit, carried by the person and transmitting a magnetic proximity signal, relative to the machine based on a received signal strength of the magnetic proximity signal received by at least two of a plurality of receiver units, each of the plurality of receiver units located on the machine at a known location; and outputting a proximity warning signal if the location of the first transmitter unit relative to the machine is within a first geometrically defined boundary around the machine According to one implementation, the machine includes a control interface for controlling operation of the machine, and the method further includes outputting a control signal to the control interface of the machine to limit the operation of the machine if the location of the first transmitter unit relative to the machine is within a second boundary around the machine.

According to another implementation, the first transmitter unit further comprises a first digital radio transmitter for sending a transmitter unit digital radio message having a temporal relationship with the magnetic proximity signal, and the method further includes outputting the control signal to the control interface of the machine if the transmitter unit digital radio message has not been received within a predetermined period of time.

According to yet another implementation, the first transmitter unit further comprises a first digital radio transmitter for sending a transmitter unit digital radio message having a temporal relationship with the magnetic proximity signal, and the method further includes receiving the transmitter unit digital radio message and the magnetic proximity signal from the first transmitter unit, and assigning an identity contained in the transmitter unit digital radio message to the magnetic proximity signal.

In accordance with still another implementation, the machine includes a control interface for controlling operation of the machine and reporting an operating state of the machine, and the method further includes: receiving an operating state signal indicating the operating state of the machine from the control interface of the machine; selecting a selected boundary from a plurality of geometrically defined boundaries around the machine based on the operating state signal;

and outputting a control signal to the control interface of the machine to limit the operation of the machine if the location of the first transmitter unit relative to the machine is within the selected boundary.

According to yet another implementation, the method further includes storing time-indexed data in a non-volatile storage medium corresponding to the location of the first transmitter unit relative to the machine.

Still further, the method may include disabling the machine in response to receiving an indication of a malfunction of the first transmitter unit.

Other features and advantages of the invention will be set forth in, or apparent from, the detailed description of preferred embodiments of the invention found below.

DETAILED DESCRIPTION OF EXEMPLARY EMBODIMENTS OF THE INVENTION

For the purpose of this document, "intrinsically safe" shall be as defined by the U.S. Department of Labor, Mine Safety and Health Administration (MSHA).

Further, for the purpose of this document, the various microcontrollers described herein are understood to execute software or program instructions included in or accessible by the microcontrollers in a tangible storage medium, such as random access memory (RAM), read only memory (ROM), Electrically Erasable Programmable Read-Only Memory (EEPROM), flash memory, or the equivalent.

A. System

Figure 1:
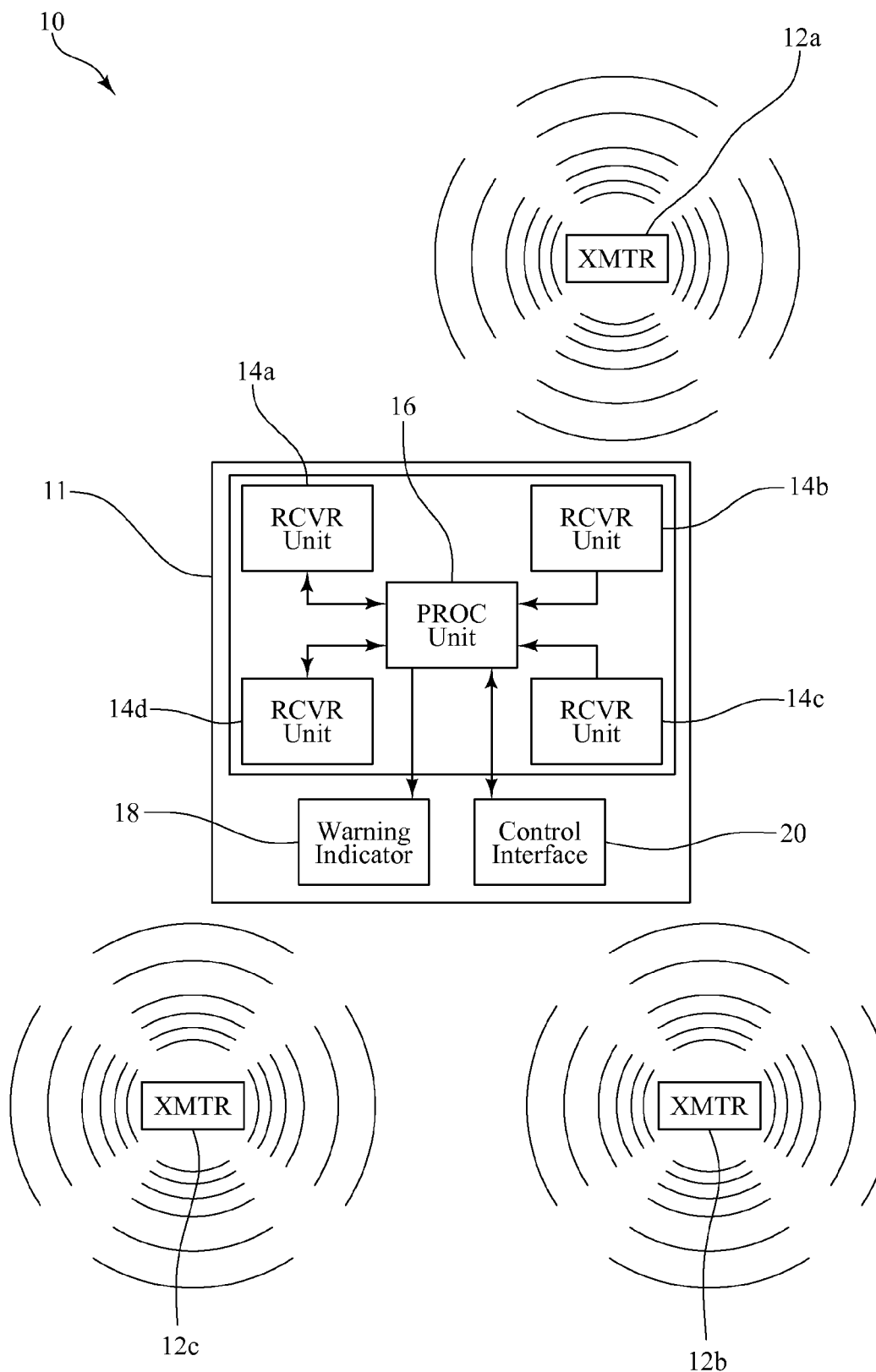
FIG. 1 is a functional block diagram of an exemplary system for proximity detection according to the invention.
Figure 2:
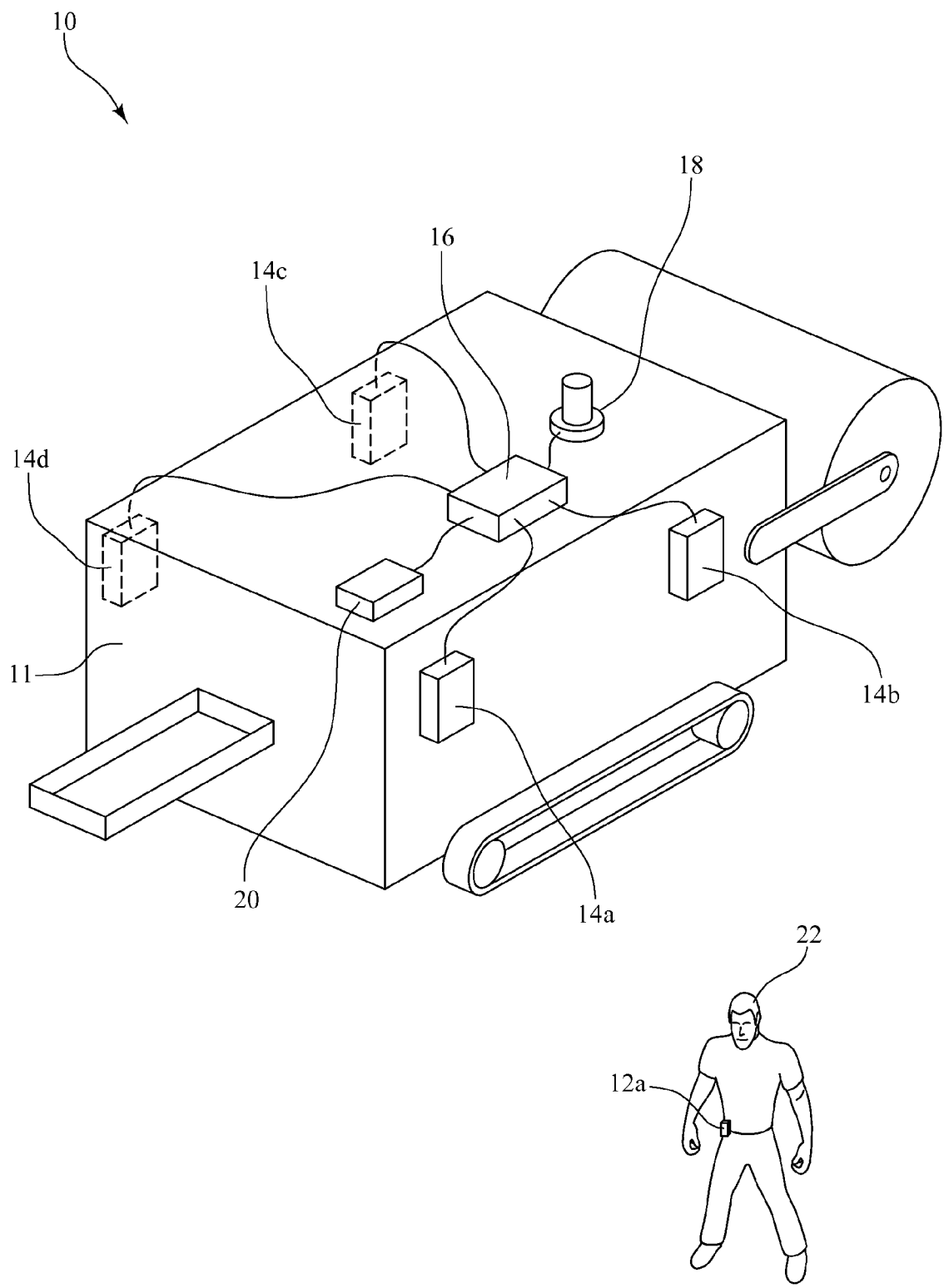
FIG. 2 is a schematic diagram of the exemplary system of claim 1.

FIG. 1 and FIG. 2 show an exemplary system 10 for detecting the proximity of a person 22 to a machine 11, including: at least a first transmitter unit 12a, a plurality of receiver units 14a-14d, a processing unit 16, and a warning indicator or device 18. The plurality of receiver units 14a-14d and the processing unit 16 comprise a receiver system. The machine 11 includes a control interface 20 for receiving commands to control operation of the machine 11 and for reporting an operating state of the machine 11. The first transmitter unit 12a is for being carried by a person 22 in proximity to the machine 11 and transmits a magnetic proximity signal having a predetermined signal strength and a predetermined signal frequency. Each of the plurality of receiver units 14a-14d is located on the machine 11 at a known location for receiving the magnetic proximity signal and determining a received signal strength of the magnetic proximity signal. The processing unit 16 is in communication with the plurality of receiver units 14a-14d and includes or accesses data defining a first boundary around the machine 11. The processing unit 16 determines a location of the first transmitter unit 12a relative to the machine 11 based on the received signal strength of the magnetic proximity signal received by at least two of the plurality of receiver units 14a-14d and the known location of the at least two of the plurality of receiver units 14a-14d. The processing unit 16 then determines if the location of the first transmitter unit 12a relative to the machine 11 is within the first boundary around the machine 11 and outputs a proximity warning signal if the first transmitter unit 12a is within the first boundary around the machine 11. As described in more detail below, the system 10 may further include a plurality of transmitter units, such as a second transmitter unit 12b and a third transmitter unit 12c.

The machine 11 includes a control interface 20 for controlling operation of the machine 11 and for reporting an operating state or operating status of the machine 11, and the processing unit 16 is in communication with the control interface 20. The machine 11 may be, for example, a continuous mining machine or another type of underground mining machine.

B. Warning Device

The warning device 18 is in communication with the processing unit 16 and provides at least a visual signal in response to receiving the proximity warning signal from the processing unit 16. The warning device 18 may also provide an audible signal in response to receiving the proximity warning signal from the processing unit 16. Thus, the warning device 18 may be, for example, a flashing strobe light and horn.

C. Proximity to Machine

Figure 3:
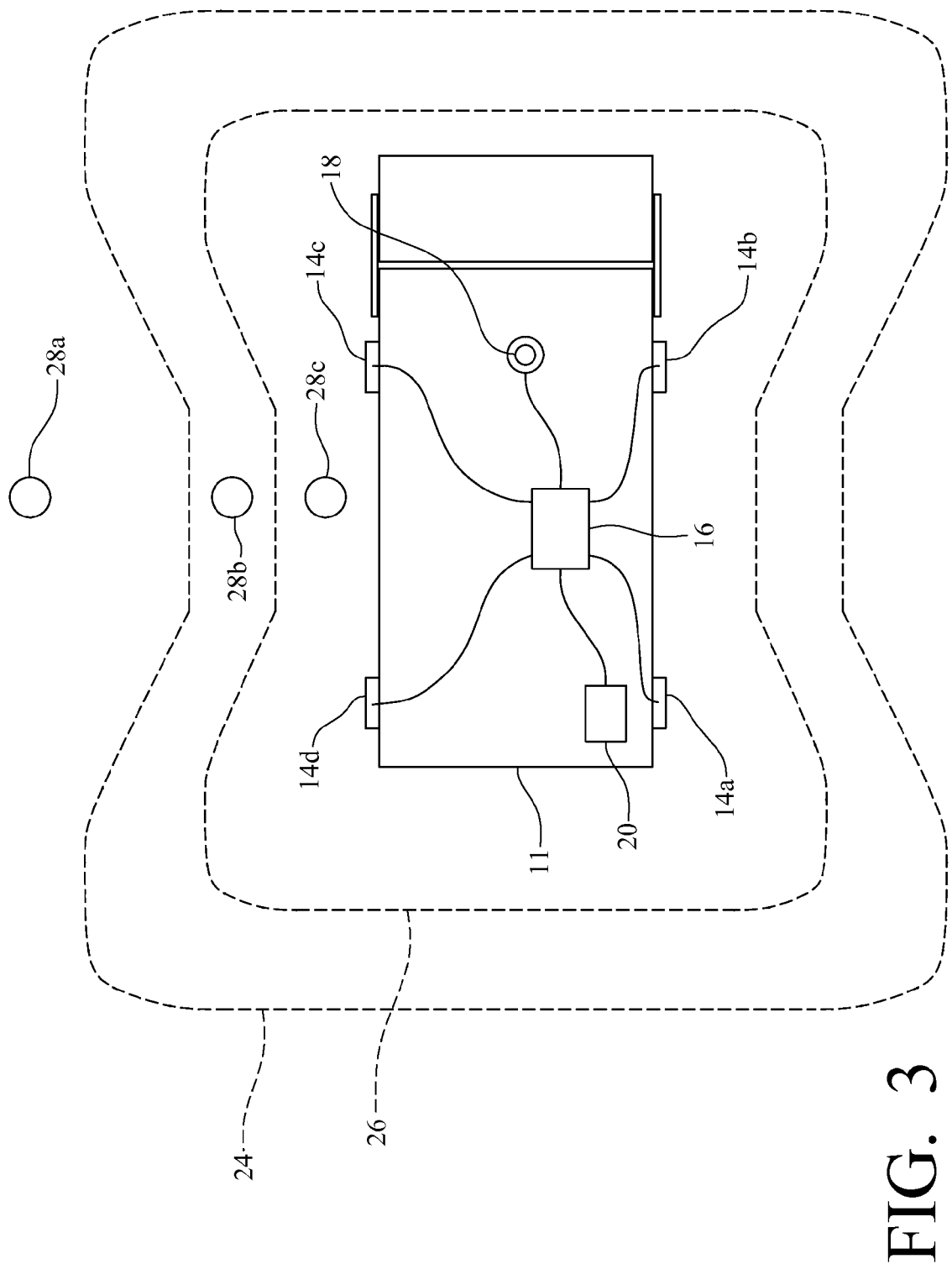
FIG. 3 is plan view showing exemplary boundaries around a machine operated with the exemplary system of FIG. 1.

FIG. 3 shows the exemplary machine 11 including the plurality of receiver units 14a-14d and a first boundary 24 around the machine 11. Advantageously, the first boundary 24 around the machine 11 can be defined to have any geometric shape. Also shown is a second boundary 26 around the machine 11. The second boundary 26 around the machine 11 is also defined by data included in or accessible by the processing unit 16. Thus, for example, the first boundary 24 may be considered a "warning boundary" and the second boundary 26 may considered a "operation limiting" boundary. Additional boundaries may also be defined by data accessible by the processing unit 16.

When the processing unit 16 determines the location of the first transmitter unit 12a or any other transmitter unit (e.g., second transmitter unit 12b, third transmitter unit 12c) (generally referred hereinafter as "transmitter unit 12"), the processing unit will respond based on the determined location. Thus, for example, if the transmitter unit 12 is at a location 28a, which is outside of the first boundary 24 around the machine 11, no action would be taken. However, if the transmitter unit 12 is determined to be at a location 28b that is within the first boundary 24 around the machine 11, the warning device 18 (FIG. 1 and FIG. 2) will provide at least a visual signal indicating that the location of the transmitter unit 12 relative to the machine 11 is within the first boundary 24. Further, the processing unit 16 (FIG. 1 and FIG. 2) outputs a control signal to the control interface 20 (FIG. 1 and FIG. 2) to limit the operation of the machine 11 if the location of the transmitter unit is at a location 28c relative to the machine 11 is within the second boundary 26 around the machine 11.

As mentioned, the processing unit 16 may include data defining a plurality of boundaries around the machine 11. Then, the processing unit 16 may receive an operating state signal indicating the operating state of the machine 11 from the control interface 20 of the machine, select a boundary (i.e., a "selected boundary") from the plurality of boundaries around the machine 11 based on the operating state signal (i.e., different boundaries can be selected based on different operating states of the machine (e.g., mining, moving or "tramming," etc.)), and output a control signal to the control interface 20 to limit the operation of the machine 11 if the location of the transmitter unit 12 relative to the machine 11 is within the selected boundary.

D. Transmitter Unit

Figure 4:
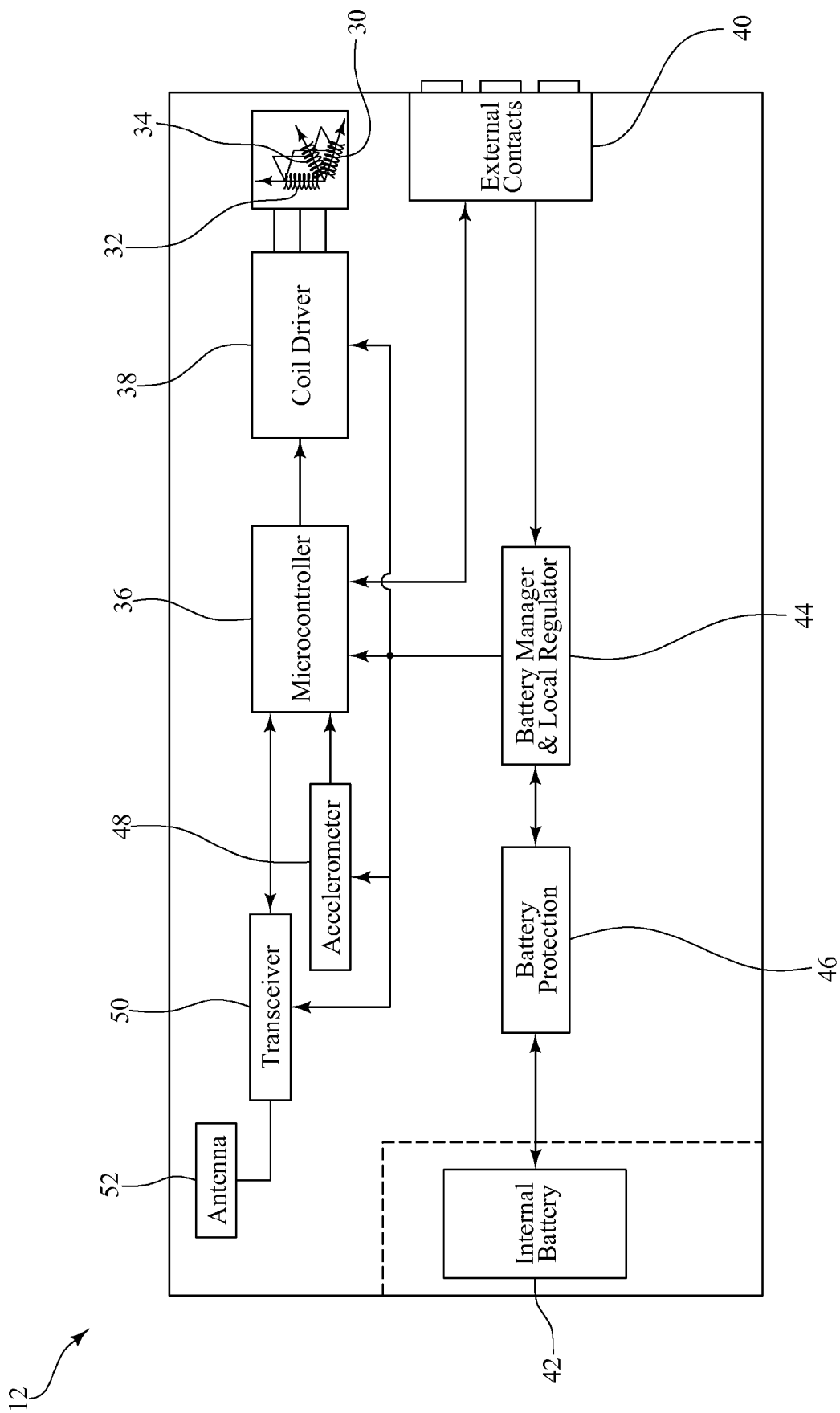
FIG. 4 is a functional block diagram of an exemplary transmitter unit of the exemplary system of FIG. 1.

FIG. 4 shows an exemplary transmitter unit 12, which is for being carried by a person and transmitting a magnetic proximity signal having a predetermined strength and a predetermined frequency. The exemplary transmitter unit 12 includes at least a first magnetic proximity signal transmitting coil 30 and a transmitter microcontroller 36 in communication with the first magnetic proximity signal transmitting coil 30 through a coil driver circuit 38. The transmitter microcontroller 36 generates the magnetic proximity signal at a frequency output pin, and the first magnetic proximity signal transmitting coil 30 is for transmitting the magnetic proximity signal at the predetermined signal strength and at the predetermined signal frequency. For example, the transmitter coils cold be driven with an 100 KHz sine wave and with a sufficiently strong signal to emit 500 mW of power.

It is noted that the magnetic proximity signal may be substantially continuous, or, preferably, periodic without departing from the spirit or the scope of the invention as claimed hereinafter. However, in the situation where multiple transmitter units are present in a given environment, it is noted that each transmitter unit will transmit only a periodic signal, as described below.

The exemplary transmitter unit 12 is preferably contained in a dust proof enclosure that passes both the magnetic proximity signal and a digital radio transmission. The enclosure may be mechanically keyed to match a transmitter charging station (not shown), and includes external contacts 40 for making electrical contact with the transmitter charging station. When the transmitter unit 12 is inserted into the charging station, the external contacts 40 provide a safe means of charging an internal battery 42 and digitally communicating with the transmitter microcontroller 36. Also, preferably, the transmitter unit 12 is intrinsically safe.

Charging current is controlled by a battery manager and local regulator circuit 44. The internal battery 42 is connected to the battery manager and local regulator circuit 44 through a battery protection circuit 46. The battery protection circuit 46 protects the battery from overcharge, over discharge, and over current conditions. The battery manager and local regulator circuit 44 feeds power to the transmitter microcontroller 36 and the coil driver circuit 38. It is noted that the functionality of the battery manager and local regulator circuit 44 can be accomplished by other circuit configurations without departing from the spirit or the scope of the invention as claimed hereinafter.

The exemplary transmitter unit 12 also includes a second magnetic proximity signal transmitting coil 32 and a third magnetic proximity signal transmitting coil 34. The second magnetic proximity signal transmitting coil 32 is in communication with the transmitter microcontroller 36 through the coil driver circuit 38, and is oriented orthogonally to the first magnetic proximity signal transmitting coil 30. The third magnetic proximity signal transmitting coil 34 is also in communication with the transmitter microcontroller 36 through the coil driver circuit 38. The third magnetic proximity signal transmitting coil 34 is further oriented orthogonally to the first magnetic proximity signal transmitting coil 30 and to the second magnetic proximity signal transmitting coil 32. Advantageously, the first magnetic proximity signal transmitting coil 30, the second magnetic proximity signal transmitting coil 32, and the third magnetic proximity signal transmitting coil 34 may all be wound on the same core.

The exemplary transmitter unit 12 further includes an accelerometer 48 in communication with the transmitter microcontroller 36 for measuring a direction of gravity. The accelerometer 48 also receives power through the battery manager and local regulator circuit 44. Thus, the transmitter microcontroller 36 is able to determine the direction of gravity using the accelerometer 48 and select a most appropriate coil based on the direction of gravity (i.e., to select the coil, and the associated driver, that is oriented to produce the most uniform magnetic field in the horizontal plane). The transmitter microcontroller 36 then generates the magnetic proximity signal for transmission by the most appropriate coil. Thus, the transmitter microcontroller 36 improves its transmission efficiency by driving only the coil that matches the orientation of the intended receiver, and produces a usable magnetic field regardless of the orientation of the transmitter unit 12.

The exemplary transmitter unit 12 further includes a first digital radio transceiver 50, which includes at least a first digital radio transmitter (not separately shown), and a first digital radio antenna 52. The first digital radio transceiver 50 is in communication with the transmitter microcontroller 36 and receives power from the battery manager and local regulator circuit 44. The first digital radio transceiver 50 is for receiving a transmitter unit digital radio message (described in more detail below) from the transmitter microcontroller 36 and sending the transmitter unit digital radio message via the first digital radio antenna 52.

E. Receiver Units

Figure 5:
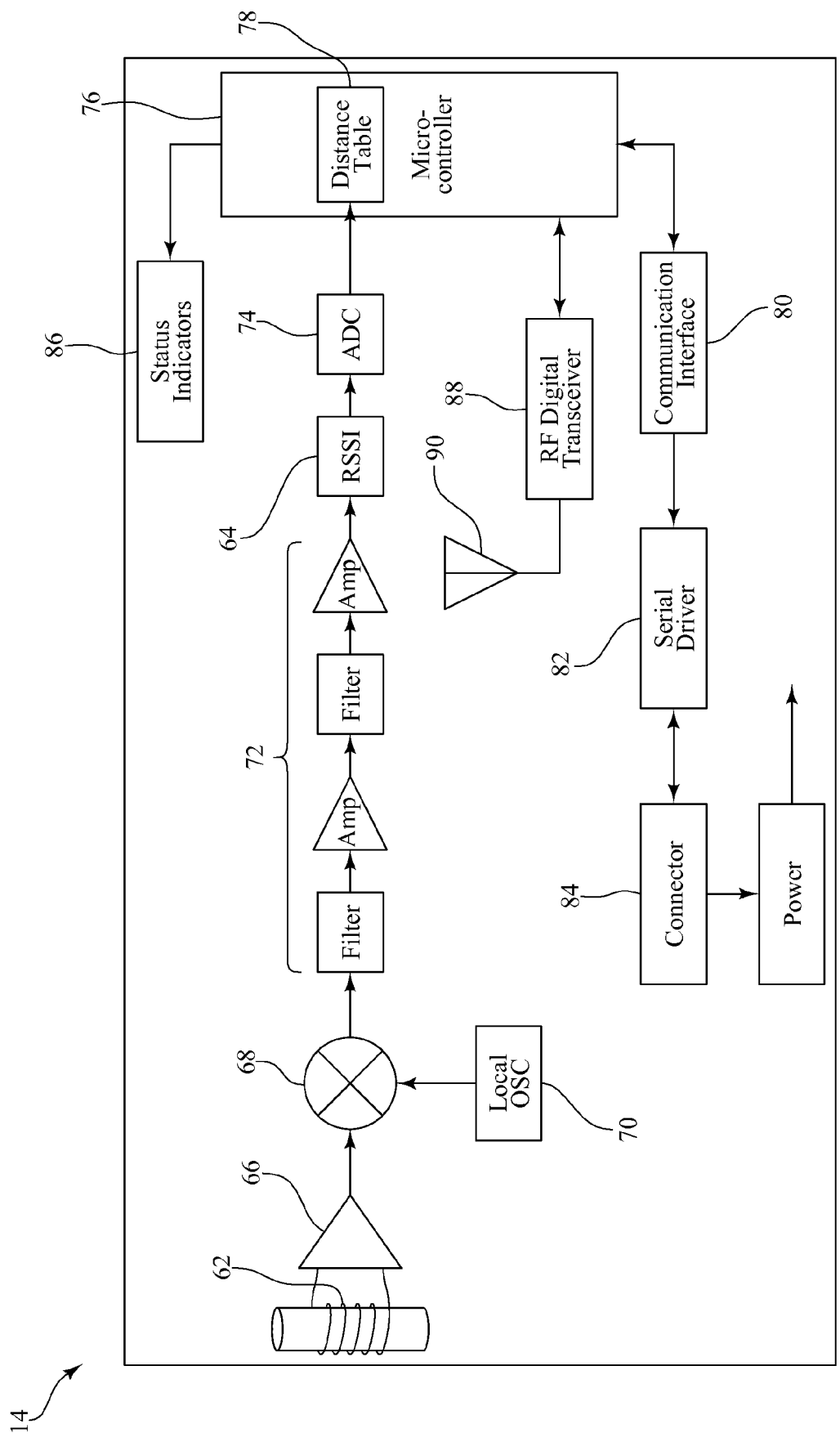
FIG. 5 is a functional block diagram of an exemplary receiver unit of the exemplary system of FIG. 1.

FIG. 5 shows an exemplary receiver unit 14 including a magnetic proximity signal receiving coil 62 for receiving the magnetic proximity signal, and a received signal strength indicator (RSSI) circuit 64 in communication with the magnetic proximity signal receiving coil 62 for determining the received signal strength of the magnetic proximity signal.

The exemplary receiver unit 14 is contained in an enclosure that is strong enough to be machine mounted and survive in a mining environment, but still pass both the magnetic proximity signal and a RF signal. Preferably, the enclosure (not shown) has at least one window to allow status lights to be visible externally.

The magnetic proximity signal is received at the magnetic proximity signal receiving coil 62 before being passed on through the receiver preamplifier 66 and the RF mixer 68. The RF mixer 68 utilizes signals from the oscillator 70 to produce frequency products. A two stage filter/amplifier 72 is used to reduce signals from other unwanted sources. The RSSI circuit 64 produces an output indicating the signal strength of the magnetic proximity signal received at the magnetic proximity signal receiving coil 62 at the predetermined frequency of the magnetic proximity signal. The output then passes through an A-to-D converter circuit 74 before being received by a receiver microcontroller 76.

The receiver microcontroller 76 preferably includes or accesses distance data in a distance data table 78 relating signal strength to experimentally determined distance values, which the receiver microcontroller 76 uses to convert the received signal strength of the magnetic proximity signal to a distance value.

The exemplary receiver unit 14 also includes a communication interface 80 in communication with the receive microcontroller 76, and a serial driver 82 in communication with the communication interface 80. A connector 84 interfaces the serial driver 82 of the exemplary receiver unit 14 to the processing unit 16 (See FIG. 1 and FIG. 2). The receiver microcontroller 76 sends the distance value to the processing unit 16 using the communication interface 80, the serial driver 82, and the connector 84.

Power for the exemplary receiver unit 14 is received from the processing unit 16 through the connector 84.

Lighted status indicators 86 are in communication with the receiver microcontroller 76, and are externally visible.

The exemplary receiving unit 14 further includes a receiver unit digital radio transceiver 88 and a receiver unit digital radio antenna 90. The receiver unit digital radio transceiver 88 is in communication with the receiver microcontroller 76 for receiving the transmitter unit digital radio messages from the transmitter unit(s) 12.

F. Processing Unit

Figure 6:
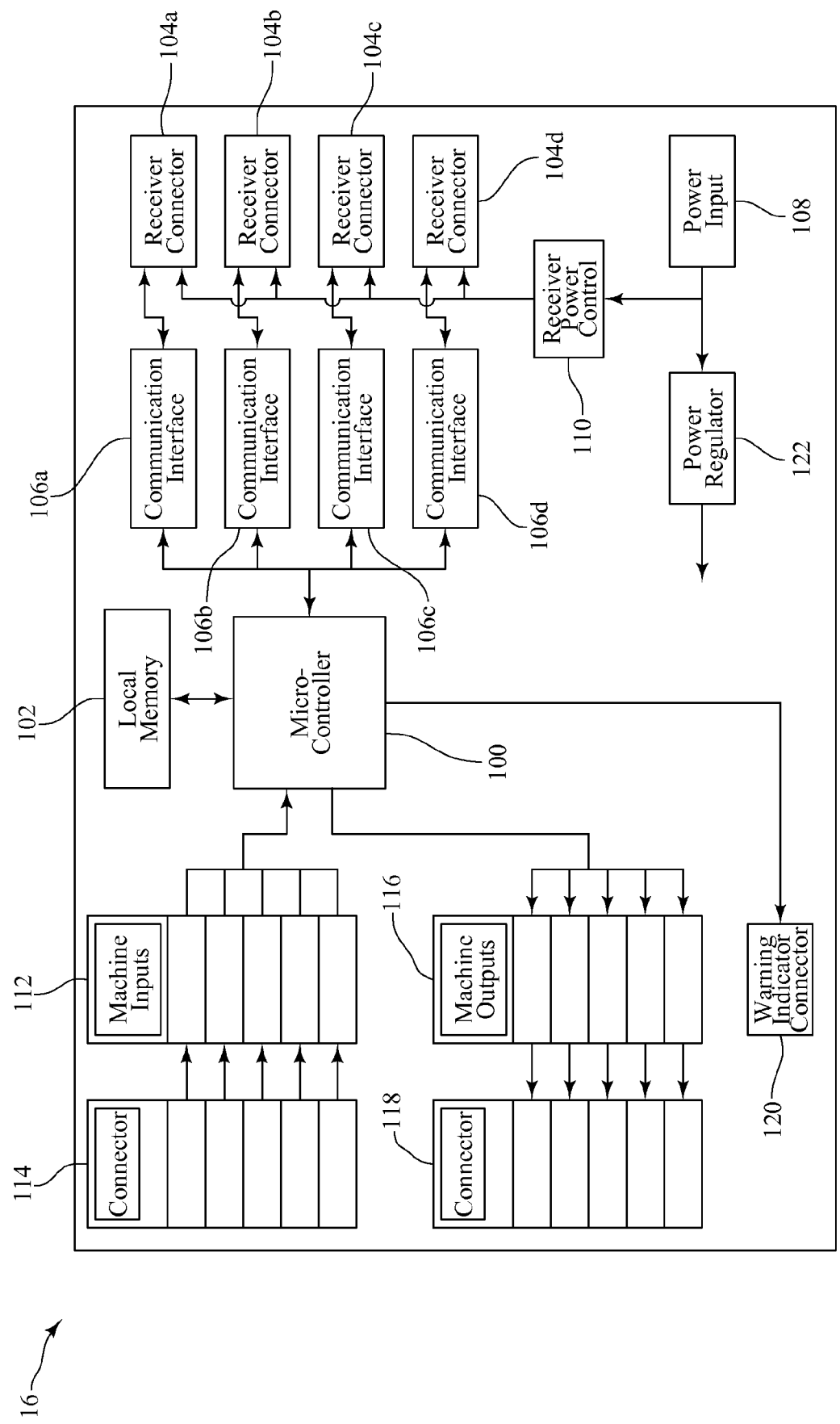
FIG. 6 is a functional block diagram of an exemplary processing unit of the exemplary system of FIG. 1.

FIG. 6 shows an exemplary processing unit 16 including a processing unit microcontroller 100 and a non-volatile storage medium 102. The processing unit microcontroller 100 is in communication with a plurality of receiver connectors 104a-104d through a plurality of communication interfaces 106a-106d. Each of the plurality of receiver connectors 104a-104d is in communication with a respective one of the receiver units 14a-14d (FIG. 1 and FIG. 2).

The exemplary processing unit 16 receives power from the machine via a power input 108. A receiver power controller 110 is in communication with the power input 108 and preferably provides intrinsically safe power to the plurality of receiver units 14a-14d (FIG. 1 and FIG. 2) via the plurality of receiver connectors 104a-104d. The plurality of communication interfaces 106a-106d also preferably makes communication between the processing unit microcontroller 100 and the plurality of receiver units 14a-14d (FIG. 1 and FIG. 2) intrinsically safe. However, it is noted that the principals taught herein are not limited to configurations requiring intrinsically safe power, but apply generally to equivalent non-intrinsically safe configurations. Preferably, the exemplary processing unit 16 is housed in an explosion proof enclosure.

Also shown are machine inputs 112, machine input connectors 114, machine outputs 116 and machine output connectors 118, which cooperate with the control interface 20 of the machine 11 (FIG. 1 and FIG. 2) for receiving the operating state signal indicating the operating state of the machine 11 and outputting a control signal to the control interface 20 of the machine 11.

Still further, the processing unit microcontroller 100 is in communication with a warning indicator connector 120 for outputting the proximity warning signal.

A power regulator 122 is in communication with the power input 108 and provides power to the exemplary processing unit 16.

In use, the plurality of receiver units 14a-14d communicate over communication cables to the processing unit 16. Using the known locations and geometry of the receiver units 14a-14d, the processing unit microcontroller 100 determines the location of the transmitter unit(s) 12 (FIG. 1 and FIG. 2) relative to the machine 11.

Figure 7:
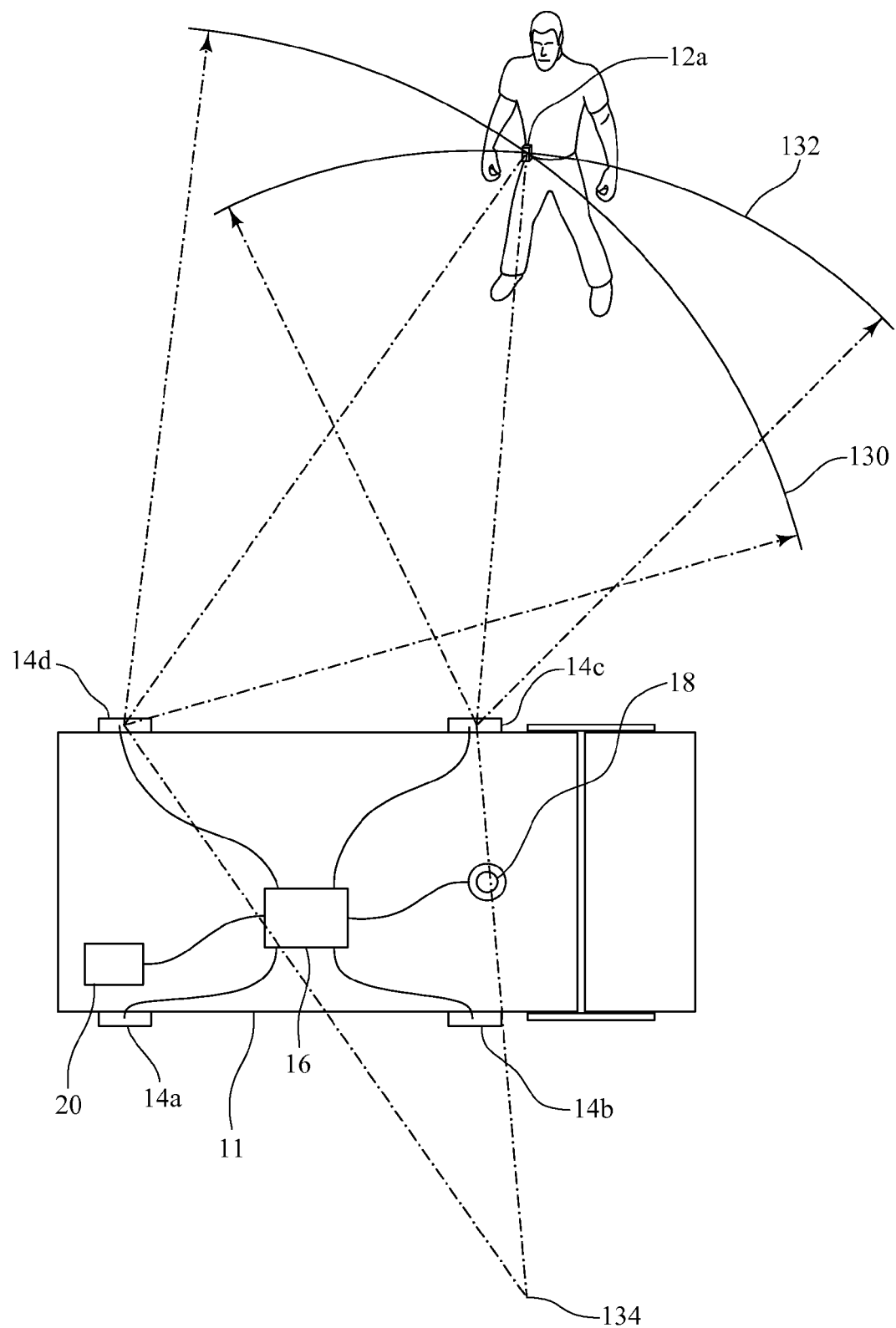
FIG. 7 is a schematic diagram of an operator in proximity to a machine whose location is determined using two of a plurality of receiver units.

For example, in one exemplary methodology for determining the location of the transmitter unit(s), as shown in FIG. 7, for each transmission by the transmitter unit(s) 12, the processing unit 16 will receive a distance value from at least two of the plurality of receiver units 14a-14d. The processing unit 16 then selects the two receiver units (e.g., two of receiver units 14a-14d) with the lowest distance values, or receiver units 14c and 14d in the example. Given the known locations of the receiver units 14c, 14d mounted on the machine 11, an arc of distance 130, 132 from each receiver unit 14c, 14d is determined. The two arcs 130, 132 will intersect in two places. The location that is to the exterior of the machine 11 is the correct location. The second location 134 is dismissed since it is not to the exterior of the machine 11 with reference to the receiver units 14c, 14d, and because the second location 134 would also be closer to the other receiver units 14a, 14b if this was the real location.

One of skill in the art will recognize that other equivalent methodologies for determining the location of the transmitter unit(s) are possible within the spirit and scope of the invention as claimed hereinafter.

The data defining one or more boundaries around the machine 11 is stored in the non-volatile storage medium 102. If the first transmitter unit 12a is determined to be within one or more of these boundaries, the processing unit 16 activates the warning signal and may send the control signal to the control interface 20 of the machine 11 to limit the operation of the machine 11. The operation of the machine can be limited even to the point of shutting down the machine 11. The processing unit 16 also senses the operating state of the machine and may select a boundary from a plurality of boundaries around the machine based on that operating state.

The processing unit may further store time-indexed data in the non-volatile storage medium 102 for future retrieval. The time indexed data may include location information regarding the first transmitter unit 12a and information regarding the operating state of the machine 11. Advantageously, the information stored in the non-volatile memory 102 can be retrieved for further analysis. For example, the processing unit 16 could further include an additional radio (i.e., a wireless network interface) or other interface that allows an external computer to download the contents of the non-volatile storage medium 102.

G. Additional Details

In one exemplary embodiment, the transmitter unit 12 transmits the magnetic proximity signal for a brief time followed by a period of time with no transmission that varies randomly. The short duration transmission and variation in period of time with no transmission allows multiple transmitter units 12 to be detected individually with some probability.

In another embodiment, the exemplary transmitter unit 12 sends digital radio messages using the first digital radio transceiver 50 and the first digital radio antenna 52 (see FIG. 4). In this embodiment, the processing unit 16 outputs a control signal to the control interface 20 of the machine 11 (FIG. 1 and FIG. 2) to limit the operation of the machine 11 if the transmitter unit digital radio message has not been received by at least one of the plurality of receiver units 14a-14d within a predetermined period of time (i.e., indicating unattended operation of the machine 11).

In another embodiment, a plurality of transmitter units (e.g., FIG. 1, 12a, 12b, 12c) are present around a machine 11.

Each of the plurality of transmitter units comprises a digital radio transmitter for sending a digital radio message. Each of the digital radio messages contains a unique identification code. Further, each of the transmitter units comprises a digital radio receiver, and sends the digital radio message and the magnetic proximity signal with a predetermined temporal relationship (e.g., the digital radio message is sent five milliseconds prior to the magnetic proximity signal). The plurality of receiver units 14a-14d can then correlate by timing the arrival of the transmitter unit digital radio message and the magnetic proximity signal, which allows assignment of an identity to the magnetic signal. Further, prior to sending the respective digital radio message and magnetic proximity signal, each of the transmitter units 12 can verify that the other transmitter units 12 are not transmitting by using the respective digital radio receiver. If a digital radio message is received from another transmitter unit 12, transmission can be delayed to avoid interfering with the other transmission.

In yet another embodiment, the exemplary transmitter unit 12 (FIG. 4) further comprises a means for verifying proper operation of the transmitter unit and a means for indicating a transmitter malfunction if proper operation of the transmitter unit is to verified. For example, the exemplary transmitter unit 12 could monitor a voltage drop of the internal battery 42 via a voltage sensor in the battery manager and local regulator circuit 44 during transmission of the magnetic proximity signal. A voltage drop within an anticipated range indicates that the magnetic proximity signal transmitting coil (e.g., 30, 32, 34) is operating properly. The means for indicating a transmitter malfunction may include a visual indicator which the transmitter microcontroller 36 flashes to indict a transmitter malfunction. Alternatively or additionally, the transmitter unit may indicate a transmitter malfunction as a part of the digital message transmitted by the first digital radio transceiver 50 and the first digital radio antenna 52. In this case, the processing unit microcontroller 100 will receive the digital message indicating a transmitter malfunction via the receiver units 14a-14d. Further, the processing unit microcontroller 100 may then disable the machine 11 through the control interface 20 if the transmitter unit with a defective coil is within radio range.

H. Charger Unit

Figure 8:
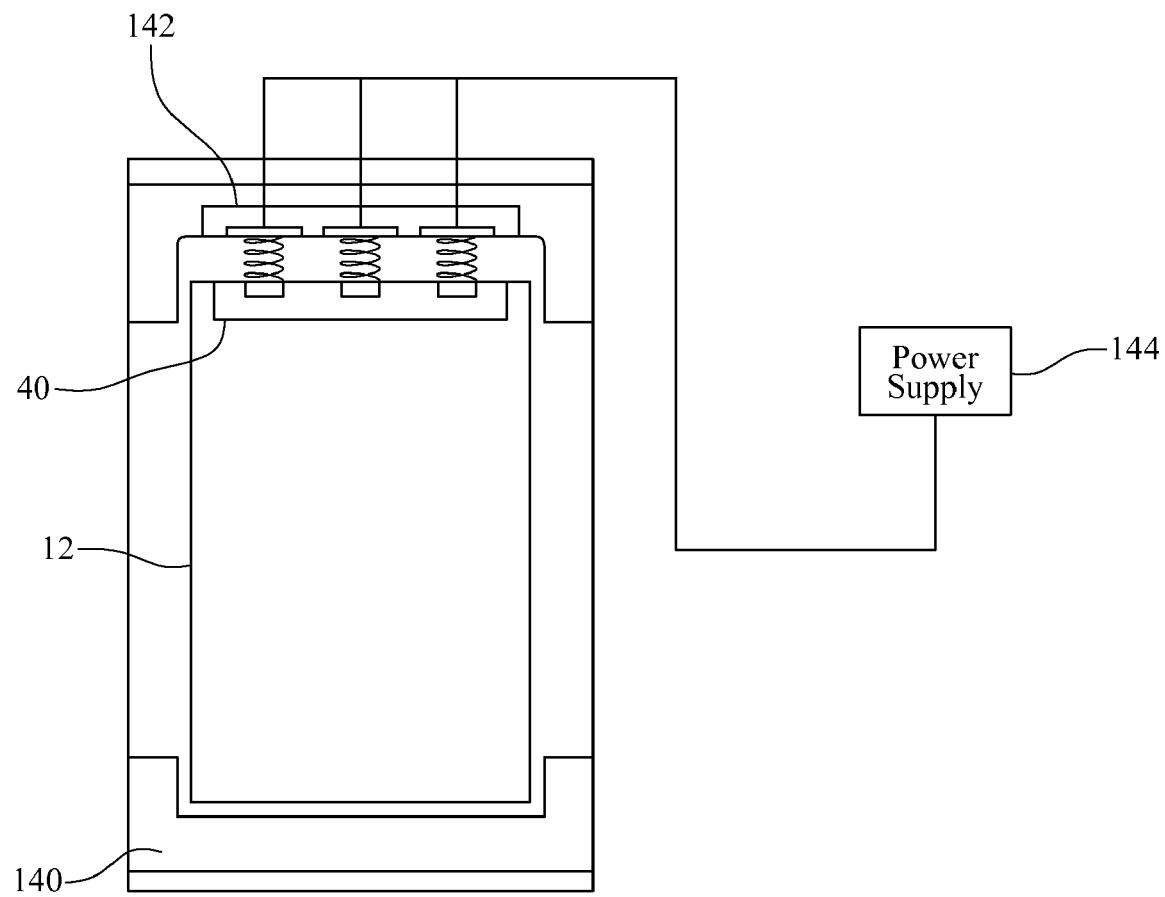
FIG. 8 is a schematic diagram of an exemplary transmitter unit positioned in an exemplary charger unit.

FIG. 8 shows an exemplary transmitter unit 12 positioned in an exemplary charger unit 140. The external context 40 of the exemplary transmitter unit 12 are biased against a set of charging contacts 142 of the charger 140, which are supplied with power from a power supply 144. Additionally, although not shown, a communication with the transmitter microcontroller 36 may also be made through the external context 40 of the transmitter unit 12 and the charger context 142 of the charger 140.

I. Additional Steps and Configurations

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

Thus, the scope of the invention should be determined by the appended claims and their legal equivalents, and not by the examples given.

What is claimed is:

1. A system for detecting a proximity of a person to a machine, comprising:
   a first transmitter unit for being carried by the person, the first transmitter unit transmitting a magnetic proximity signal having a predetermined signal strength and a predetermined signal frequency;
   a plurality of receiver units, each of the plurality of receiver units located on the machine at a known location for receiving the magnetic proximity signal and determining a received signal strength of the magnetic proximity signal;
   a processing unit in communication with the plurality of receiver units and including a storage medium having data defining a first boundary around the machine, the processing unit:
      determining a location of the first transmitter unit relative to the machine based on the received signal strength of the magnetic proximity signal received by at least two of the plurality of receiver units and the known location of the at least two of the plurality of receiver units; and
      outputting a proximity warning signal if the location of the first transmitter unit relative to the machine is within the first boundary around the machine.

2. The system of claim 1, further comprising a warning device in communication with the processing unit, the warning device providing a visual signal in response to receiving the proximity warning signal from the processing unit.

3. The system of claim 2, wherein the warning device further provides an audible signal in response to receiving the proximity warning signal from the processing unit.

4. The system of claim 1,
   wherein the machine includes a control interface for controlling operation of the machine,
   wherein the processing unit is in communication with the control interface for controlling the operation of the machine and includes data defining a second boundary around the machine, and
   wherein the processing unit outputs a control signal to the control interface of the machine to limit the operation of the machine if the location of the first transmitter unit relative to the machine is within the second boundary around the machine.

5. The system of claim 1,
   wherein the machine includes a control interface for controlling operation of the machine and reporting an operating state of the machine,
   wherein the processing unit is in communication with the control interface for controlling the operation of the machine and includes data defining a plurality of boundaries around the machine, and
   wherein the processing unit:
      receives an operating state signal indicating the operating state of the machine from the control interface of the machine;
      selects a selected boundary from the plurality of boundaries around the machine based on the operating state signal; and
      outputs a control signal to the control interface of the machine to limit the operation of the machine if the location of the first transmitter unit relative to the machine is within the selected boundary.

6. The system of claim 1, wherein the processing unit further comprises a non-volatile storage medium, and stores time-indexed data in the non-volatile storage medium corresponding to the location of the first transmitter unit relative to the machine.

7. The system of claim 6, wherein the machine includes a control interface for reporting an operating state of the machine, and wherein the processing unit is in communication with the control interface and stores time-indexed data in the non-volatile storage medium corresponding to the operating state of the machine.

8. The system of claim 1, wherein the first transmitter unit comprises a transmitter microcontroller for generating the magnetic proximity signal, and a first magnetic proximity signal transmitting coil for transmitting the magnetic proximity signal.

9. The system of claim 8, wherein the first transmitter unit further comprises:
   a second magnetic proximity signal transmitting coil in communication with the transmitter microcontroller and oriented orthogonally to the first magnetic proximity signal transmitting coil;
   a third magnetic proximity signal transmitting coil in communication with the transmitter microcontroller and oriented orthogonally to the first magnetic proximity signal transmitting coil and to the second magnetic proximity signal transmitting coil; and
   an accelerometer in communication with the transmitter microcontroller, the accelerometer measuring a direction of gravity;
   wherein the transmitter microcontroller selects a most appropriate coil based on the direction of gravity and generates the magnetic proximity signal for transmission by the most appropriate coil.

10. The system of claim 8, wherein each of the plurality of receiver units comprises a magnetic proximity signal receiving coil for receiving the magnetic proximity signal, and a received signal strength indicator (RSSI) circuit in communication with the magnetic proximity signal receiving coil for determining the received signal strength of the magnetic proximity signal.

11. The system of claim 10, wherein each of the plurality of receiver units further comprises a receiver microcontroller in communication with the RSSI circuit and includes a receiver storage medium having distance data for converting the received signal strength of the magnetic proximity signal to a distance value.

12. The system of claim 11,
   wherein the first transmitter unit further comprises a first digital radio transmitter for sending a transmitter unit digital radio message having a temporal relationship with the magnetic proximity signal, and
   wherein each of the plurality of receiver units comprises a respective digital radio receiver for receiving the transmitter unit digital radio message.

13. The system of claim 12, wherein the processing unit outputs a control signal to a control interface of the machine to limit operation of the machine if the transmitter unit digital radio message has not been received by at least one of the plurality of receiver units within a predetermined period of time.

14. The system of claim 12, further comprising a second transmitter unit comprising a second digital radio transmitter for sending a second transmitter unit digital radio message, wherein the transmitter unit digital radio message contains a first unique identification code, wherein the second transmitter unit digital radio message contains a second unique identification code.

15. The system of claim 14,
   wherein the first transmitter unit further comprises a first digital radio receiver, and sends the transmitter unit digital radio message and the magnetic proximity signal with a predetermined temporal relationship,
   wherein the second transmitter unit further comprises a second digital radio receiver, and sends the second transmitter unit digital radio message and the magnetic proximity signal with the predetermined temporal relationship, and
   wherein the first transmitter unit verifies that the second transmitter unit is not transmitting using the first digital radio receiver before sending the transmitter unit digital radio message and the magnetic proximity signal, and the second transmitter unit verifies that the first transmitter unit is not transmitting using the second digital radio receiver before sending the second transmitter unit digital radio message and the magnetic proximity signal.

16. The system of claim 8, wherein the first transmitter unit further comprises a means for verifying proper operation of the first transmitter unit and a means for indicating a transmitter malfunction if proper operation of the first transmitter unit is not verified.

17. The system of claim 16, further comprising a means for disabling the machine in response to an indication of a transmitter malfunction by the means for indicating a transmitter malfunction.

18. A method for detecting a proximity of a person to a machine, comprising:
   determining a location of a first transmitter unit, carried by the person and transmitting a magnetic proximity signal, relative to the machine based on a received signal strength of the magnetic proximity signal received by at least two of a plurality of receiver units, each of the plurality of receiver units located on the machine at a known location; and
   outputting a proximity warning signal if the location of the first transmitter unit relative to the machine is within a first geometrically defined boundary around the machine.

19. The method of claim 18, wherein the machine includes a control interface for controlling operation of the machine, further comprising outputting a control signal to the control interface of the machine to limit the operation of the machine if the location of the first transmitter unit relative to the machine is within a second boundary around the machine.

20. The method of claim 19, wherein the first transmitter unit further comprises a first digital radio transmitter for sending a transmitter unit digital radio message having a temporal relationship with the magnetic proximity signal, further comprising outputting the control signal to the control interface of the machine if the transmitter unit digital radio message has not been received within a predetermined period of time.

21. The method of claim 18, wherein the first transmitter unit further comprises a first digital radio transmitter for sending a transmitter unit digital radio message having a temporal relationship with the magnetic proximity signal, further comprising receiving the transmitter unit digital radio message and the magnetic proximity signal from the first transmitter unit, and assigning an identity contained in the transmitter unit digital radio message to the magnetic proximity signal.

22. The method of claim 18, wherein the machine includes a control interface for controlling operation of the machine and reporting an operating state of the machine, further comprising:
- receiving an operating state signal indicating the operating state of the machine from the control interface of the machine;
- selecting a selected boundary from a plurality of geometrically defined boundaries around the machine based on the operating state signal; and
- outputting a control signal to the control interface of the machine to limit the operation of the machine if the location of the first transmitter unit relative to the machine is within the selected boundary.

23. The method of claim 18, further comprising storing time-indexed data in a non-volatile storage medium corresponding to the location of the first transmitter unit relative to the machine.

24. The method of claim 18, further comprising disabling the machine in response to receiving an indication of a malfunction of the first transmitter unit.

* * * * *